(12) United States Patent  
Bothello et al.

(10) Patent No.: US 10,931,747 B2  
(45) Date of Patent: Feb. 23, 2021

(54) METHODS AND APPARATUS FOR NETWORK ADDRESS IDENTIFICATION

(71) Applicant: Walmart Apollo, LLC, Bentonville, AR (US)

(72) Inventors: Gerald Bothello, Foster City, CA (US); Surajit Roy, Gilroy, CA (US); Giridhar Bhujanga, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 100 days.

(21) Appl. No.: 16/263,471

(22) Filed: Jan. 31, 2019

(65) Prior Publication Data
US 2020/0252453 A1 Aug. 6, 2020

(51) Int. Cl.
*H04L 29/08* (2006.01)
*H04L 29/12* (2006.01)

(52) U.S. Cl.
CPC ........ *H04L 67/1068* (2013.01); *H04L 61/106* (2013.01); *H04L 67/1042* (2013.01); *H04L 67/02* (2013.01)

(58) Field of Classification Search
CPC ...... H04L 67/00–67/42; H04L 61/00–61/6095
See application file for complete search history.

(56) References Cited

U.S. PATENT DOCUMENTS

| 7,239,629 B1* | 7/2007 | Olshansky | H04Q 3/0045 370/353 |
| 2013/0136126 A1* | 5/2013 | Wang | H04L 61/103 370/392 |
| 2016/0198003 A1* | 7/2016 | Luft | H04L 67/2823 709/225 |
| 2019/0235909 A1* | 8/2019 | Jin | H04L 41/046 |

* cited by examiner

*Primary Examiner* — Clayton R Williams
(74) *Attorney, Agent, or Firm* — Duane Morris LLP; Manita Rawat (57) ABSTRACT

This application relates to apparatus and methods for communication with and management of datacenters, such as cloud datacenters employing multiple servers. A control server may identify one or more networks to be searched in a plurality of datacenters. The control server may identify a user request to execute the search for the networks in the plurality of datacenters. Based on the user request, the control server may generate a plurality of requests that request network data from the plurality of datacenters. The control server may transmit the plurality of requests to the plurality of datacenters. The control server may determine if a response to the requests is received. The response may include network data identifying one or more networks a datacenter supports. The control server may determine if the supported networks match the identified networks, and may provide status for display based on the determination.

20 Claims, 7 Drawing Sheets

METHODS AND APPARATUS FOR NETWORK ADDRESS IDENTIFICATION

TECHNICAL FIELD

The disclosure relates generally to data systems that employ servers and, more specifically, to data system management and communications.

BACKGROUND

Some datacenters, such as cloud datacenters, may employ multiple servers to handle various data processing tasks. For example, a cloud datacenter may employ hundreds of compute servers to process large amounts of data. Datacenters may also include data storage capabilities, such as memory devices that allow for the storage of data, and networking resources that allow for communication among and with the servers. In some datacenter examples, servers may execute one or more hypervisors that run one or more virtual machines (VMs). To manage datacenters including the various servers, some data systems employ software tools such as Openstack®.

In some examples, status information from a datacenter is desired to manage the datacenter. For example, an operator may desire to locate a Virtual Machine (VM) or application that is associated with a particular network address and executing within a datacenter. Each datacenter may be associated with multiple network addresses, such as multiple software-defined networking (SDN) supernetting (e.g., classless inter-domain routing (CIDR) based network address). Moreover, each SDN supernet may be further divided into subnets. An operator may wish to locate a VM or application assigned to a particular network address due to, for example, malicious activity such as a fishing attack, a packet flood, or for any other reason. To locate the particular network address among multiple datacenters, each with multiple network addresses, however, current systems may require the operator to individually access each datacenter to determine if the network address is associated with that datacenter. As such, there are opportunities to address these and other problems with current data systems.

SUMMARY

The embodiments described herein are directed to datacenter, such as cloud datacenter, and server communications. The embodiments may allow for a more efficient mechanism of transmitting data to, and receiving data from, servers of a datacenter. For example, the embodiments may allow for faster communications with multiple datacenters under management. In some examples, the embodiments may allow for more streamlined communications with multiple datacenters.

In accordance with various embodiments, exemplary systems may be implemented in any suitable hardware or hardware and software, such as in any suitable computing device. For example, in some embodiments, a computing device is configured to identify at least one network address, such as an Internet Protocol address, to be searched for. The computing device may also be configured to identify a plurality of datacenters for which to search for the at least one network address. The computing device may be configured to identify a user request, such as in input to a user interface, to search the plurality of datacenters for the at least one network address. The computing device may be configured generate, in response to the identified user request, a plurality of requests to be transmitted to the identified plurality of datacenters. In some examples, each of the plurality of requests is a request to a corresponding datacenter of the plurality of datacenters for at least one network supported by the corresponding datacenter. The computing device may be configured to transmit the plurality of requests to the plurality of datacenters. In some examples, the computing device may be configured to receive at least one response to the transmitted plurality of requests to the plurality of datacenters, where the at least one response comprises network data identifying at least one supported network. The computing device may also be configured to determine that the at least one supported network corresponds to the at least one network address. For example, the computing device may determine if the at least one network address falls within a subnet of the at least one supported network.

In some embodiments, a method is provided that includes identifying at least one network address to be searched. The method may also include identifying a plurality of datacenters for which to search for the at least one network address. The method may further include identifying a user request to search the plurality of datacenters for the at least one network address. The method may include generating, in response to the identified user request, a plurality of requests to the identified plurality of datacenters, where each of the plurality of requests is a request to a corresponding datacenter of the plurality of datacenters for at least one network supported by the corresponding datacenter. The method may further include transmitting the plurality of requests to the plurality of datacenters. In some examples, the method may include receiving at least one response to the transmitted plurality of requests to the plurality of datacenters, where the at least one response comprises network data identifying at least one supported network. The method may also include determining that the at least one supported network corresponds to the at least one network address.

In yet other embodiments, a non-transitory computer readable medium has instructions stored thereon, where the instructions, when executed by at least one processor, cause a computing device to perform operations that include identifying at least one network address to be searched. The operations may also include identifying a plurality of datacenters for which to search for the at least one network address. The operations may further include identifying a user request to search the plurality of datacenters for the at least one network address. The operations may include generating, in response to the identified user request, a plurality of requests to the identified plurality of datacenters, where each of the plurality of requests is a request to a corresponding datacenter of the plurality of datacenters for at least one network supported by the corresponding datacenter. The operations may further include transmitting the plurality of requests to the plurality of datacenters. In some examples, the operations may include receiving at least one response to the transmitted plurality of requests to the plurality of datacenters, where the at least one response comprises network data identifying at least one supported network. The operations may also include determining that the at least one supported network corresponds to the at least one network address.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
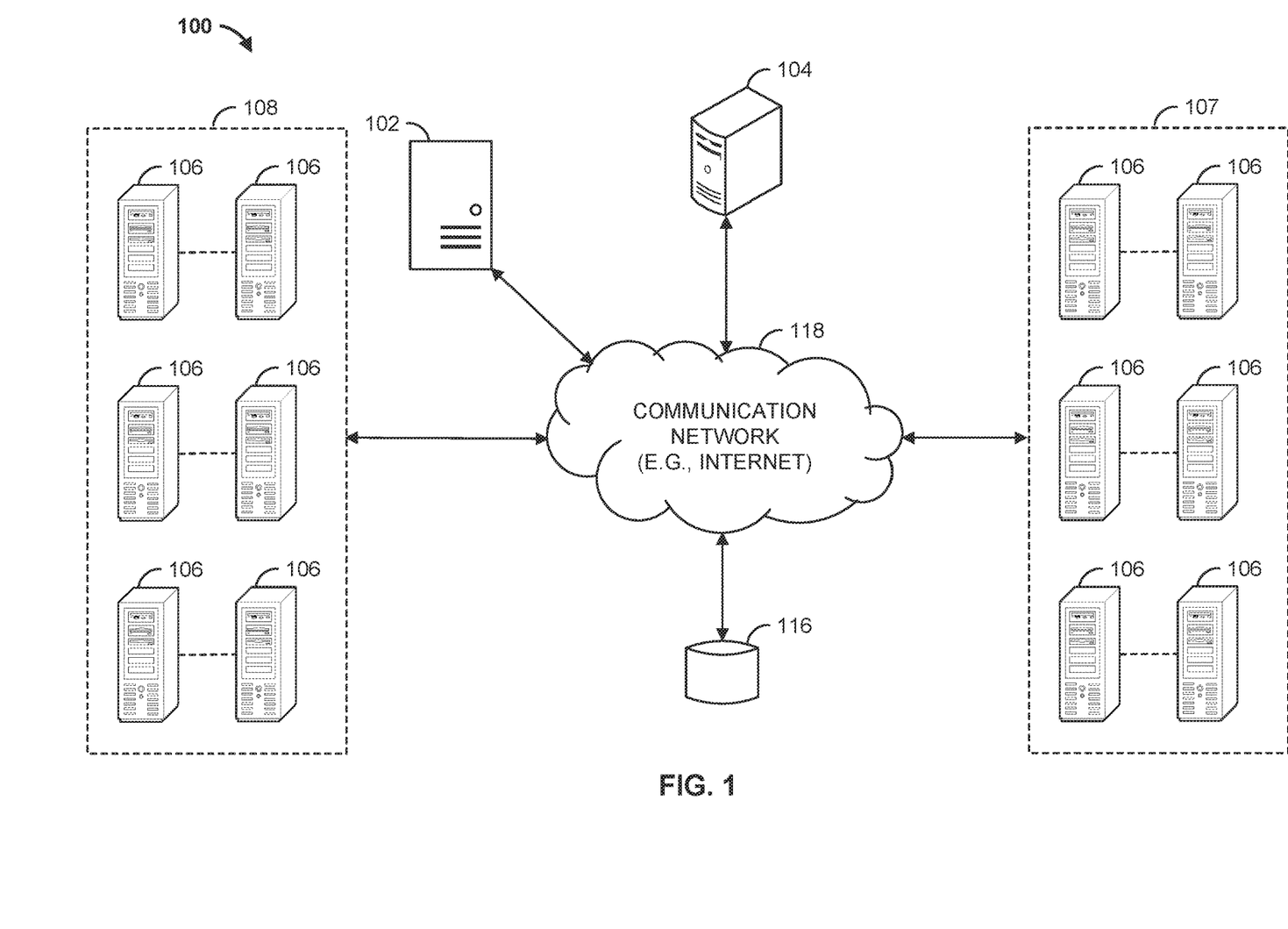
FIG. 1 is a block diagram of a server management system in accordance with some embodiments.

Turning to the drawings, FIG. 1 illustrates a block diagram of a server management system 100 that includes a control server 102, web server 104, database 116, and compute servers 106 communicatively coupled over network 118. Compute servers 106 may be part of a cloud datacenter 107, or cloud datacenter 108, for example. Control computing device 102, web server 104, and compute servers 106 can each be any suitable computing device that includes any hardware or hardware and software combination for processing and handling information. For example, any of control server 102, web server 104, and compute servers 106 can be a computer, a workstation, a laptop, a server such as a cloud-based server, a web server, a smartphone, or any other suitable device. In addition, each control server 102, web server 104, and compute servers 106 can transmit data to, and receive data from, communication network 118.

Each of control server 102, web server 104, and compute servers 106 can include one or more processors, one or more field-programmable gate arrays (FPGAs), one or more application-specific integrated circuits (ASICs), one or more state machines, digital circuitry, or any other suitable circuitry. Although FIG. 1 illustrates six computer servers 106 in each cloud datacenter 107, 108, server management system 100 can include any number of compute severs 106 in any number of cloud datacenters 107, 108. Similarly, server management system 100 can include any number of control servers 102, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Each of compute servers 106 may run one or more processing tasks, such as hypervisors that execute one or more virtual machines. Each hypervisor may support one or more virtual machines (VMs). For example, each hypervisor may be assigned one or more VMs to run. Each VM may be based on a virtual machine operating system, such as a Microsoft®, Linux®, Red Hat®, MacOS®, or any other VM operating system. Each hypervisor may run one or more of the same, or differing, VMs. Compute servers 106 may be operable to obtain executable code to run the one or more processing tasks from, for example, non-volatile memory. Each processing task may execute among one or more processing cores of a processor, such as a CPU, of a compute server. In some examples, a processing task may execute among one or more processors of a compute server 106, or amount compute servers 106.

In some examples, web server 104 hosts one or more webpages, such as an online retailer's website. The website may allow customers to purchase items, such as goods or services, from the website. To support the website, web server 104 may communicate with one or more of compute servers 106. For example, web server 104 may send transaction data related to the purchase of items to one or more of compute servers 106. In some examples, one or more of compute servers 106 may support the website by providing item information, such as inventory or price information, to web server 104. In some examples, one or more of compute servers 106 provide configuration files to web server 104, to support one or more websites.

Database 116 can be any suitable non-volatile memory, such as a remote storage device, a cloud-based server, a memory device on another application server, a networked computer, or any other suitable non-transitory data storage device. In some examples, database 116 can be a local storage device, such as a hard drive, a non-volatile memory, or a USB stick. Database 116 may store datacenter network data such as cloud network data or server network data. Datacenter 116 may also store status data such as cloud status data or server status data.

Control server 102 may be operable to control and manage compute servers 106 of cloud datacenter 107 and cloud datacenter 108. For example, control server 102 may employ software that facilitates for the control of compute servers 106, such as Openstack®. Control server 102 may be operable to transmit messages (e.g., commands, requests) to compute servers 106, and to receive messages (e.g., responses, status updates) from compute servers 106. For example, control server 102 may be operable to test or configure compute servers 106 of cloud datacenter 107 and compute servers 106 of cloud datacenter 107 by transmitting configuration messages to cloud datacenter 107 and cloud datacenter 108. Similarly, control server 102 may be operable to obtain status information from compute servers 106 of cloud datacenter 107 and compute servers 106 of cloud datacenter 107. In some examples, control server 102 may obtain cloud network data from cloud datacenter 107 and cloud datacenter 108 by transmitting cloud network data request messages to cloud datacenter 107 and cloud datacenter 108. In some examples, control server 102 may transmit cloud network data request messages to a plurality of cloud datacenters, such as cloud datacenter 107 and cloud datacenter 108, in response to a single user request.

In some examples, in response to a single user request, control server 102 transmits multiple cloud network data request messages to multiple cloud datacenters 107, 108 and in response receives cloud datacenter network information for each of the multiple cloud datacenters. For example, a user may select various cloud datacenters 107, 108 from a user interface, and, in response to providing a single input to the user interface, control server 102 may transmit cloud network data request messages to the selected cloud datacenters 107, 108.

One example of a cloud network data request message may be in the form of a HyperText Transfer Protocol (HTTP) Application Program Interface (API) call. For example, control server 102 may issue HTTP API calls to various cloud datacenter regions (e.g., within a same cloud datacenter or among multiple cloud datacenters) to obtain requested cloud network data. For example, control server 102 may generate HTTP API calls to multiple cloud datacenter regions of cloud datacenters 107, 108 to obtain one or more of network addresses (e.g., as a list of networks supported by the respective cloud datacenter), subnet data for each network address, a port identification (ID) or number, CIDR data, and any associated Virtual Local Area Network (VLAN) data, for each cloud datacenter region. A network address may be, for example, an Internet Protocol (IP) address.

In some examples, control server 102 generates HTTP API calls to a specific port to obtain data from the multiple cloud datacenters 107, 108. For example, control server 102 may execute HTTP API calls directed to a particular port to obtain cloud network data. In some examples, control server 102, based on obtained cloud network data, determines how many network addresses are allocated by each datacenter or datacenter region (e.g., an independent geographic area of the cloud datacenter). Control server 102 may determine, for example, how many network addresses are currently in use, and how many network addresses are currently available.

In some examples, control server 102 may identify a processing task, such as a hypervisor, that may be associated with a network address. For example, control server 102 may obtain, from cloud datacenter 107 and cloud datacenter 108, VM data for a plurality of VMs run by hypervisors executing on compute servers 106 of multiple cloud datacenters 107, 108. The VM data may identify each VM with a VM identification (ID). Control server 102 may determine a device ID that maps to both the VM ID and, for example, a port ID associated with a network address. Based on the device ID, control server 102 may determine the network address for the VM, i.e., the network address that mapped to the same device ID as the VM ID corresponding to the VM.

Figure 2:
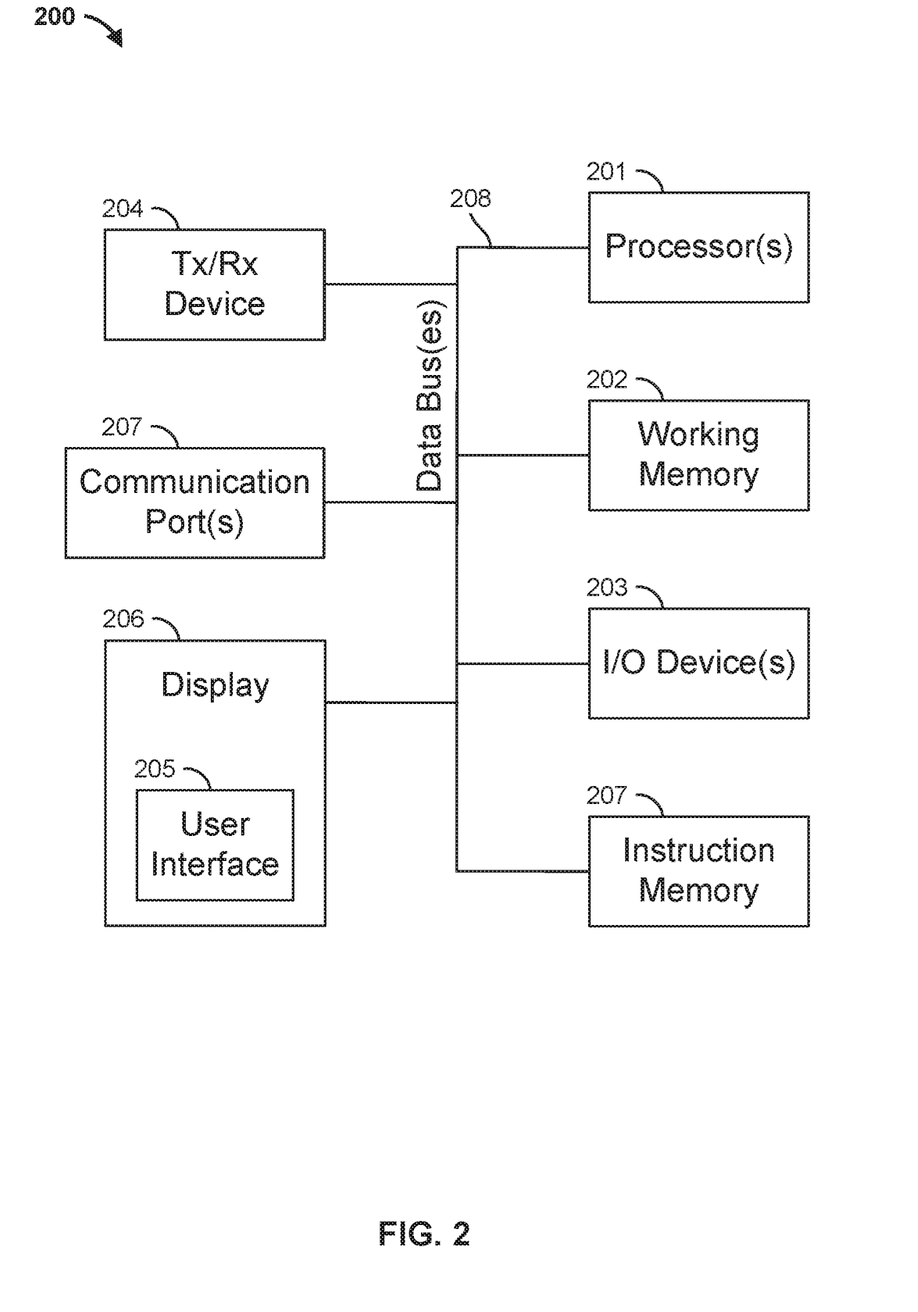
FIG. 2 is a block diagram of the example control server of the server management system of FIG. 1 in accordance with some embodiments.

FIG. 2 illustrates the control server 102 of FIG. 1. Control server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of control server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as cloud datacenter configuration files.

Display 206 can display user interface 205. User interfaces 205 can enable user interaction with control server 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 control server 102 will be operating in. Processor(s) 201 is operable to receive data from, or send data to, a network, such as communication network 118 of FIG. 1, via transceiver 204.

Figure 3:
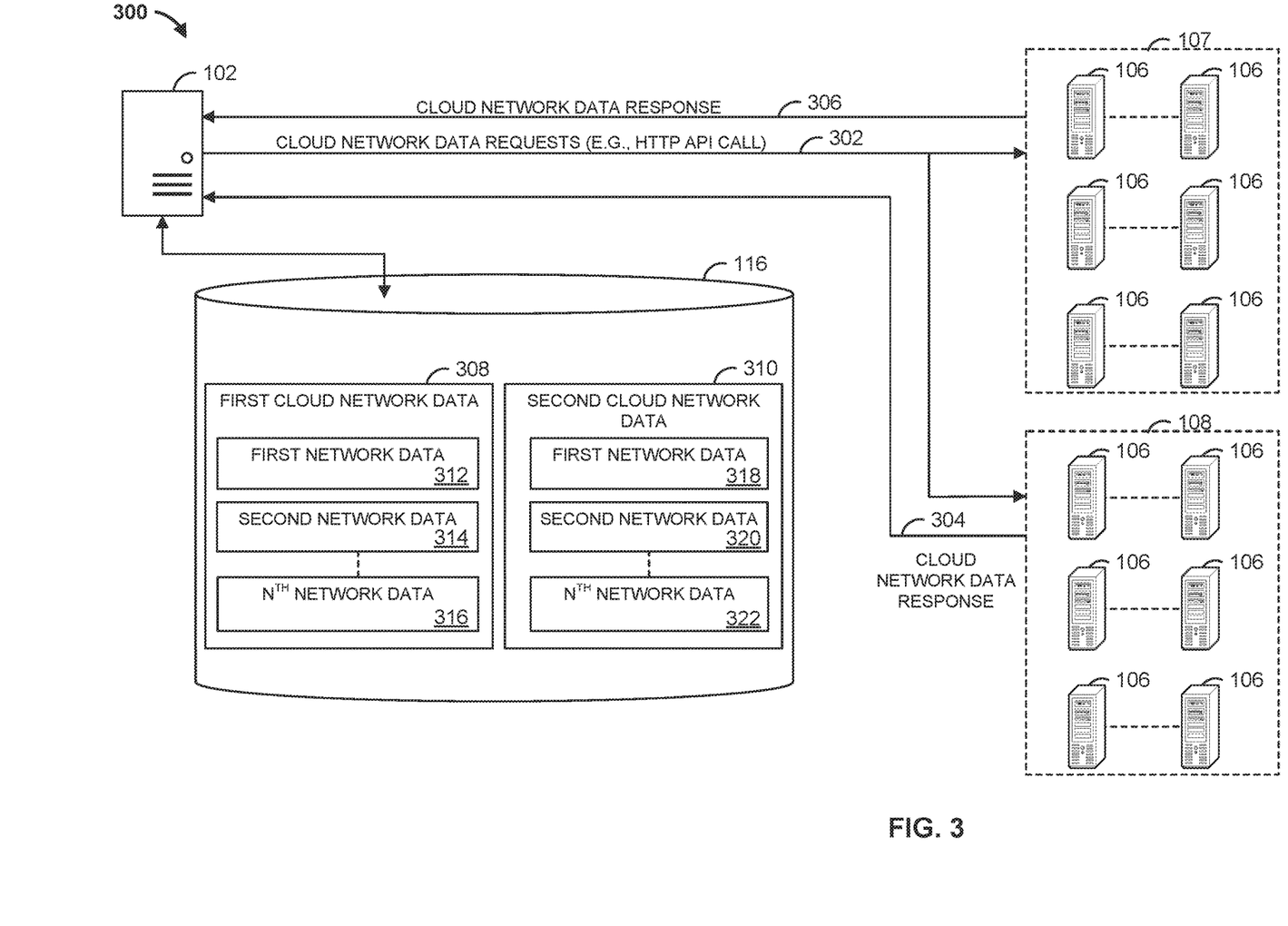
FIG. 3 is a block diagram illustrating examples of various portions of the server management system of FIG. 1 in accordance with some embodiments.

FIG. 3 is a block diagram illustrating examples of various portions of the server management system 100 of FIG. 1. As indicated in FIG. 3, control server 102 is communicatively coupled to database 116 and compute servers 106 in both cloud datacenter 107 and cloud datacenter 108. For example, control server 102 may communicate with database 116 and each compute server 106 of cloud datacenter 107 and compute server 106 of cloud datacenter 108 over network 118.

Control server 102 may generate a plurality of cloud network data requests 302, for example in response to a single user request, to obtain cloud network data for cloud datacenters 107, 108. For example, a user may log in to control server 102 via, for example, a user login screen displayed via user interface 205 on display 206. The user may be required to provide credential information such as a user name and a password, for example. The user may enter the information via I/O device 203. After successful login, a user may be redirected to a user interface 205 page that allows the user to select multiple network search identifications (IDs) for multiple cloud datacenters 107, 108. A network search ID may include, for example, data identify an IP Address or a range of IP addresses, for example. After selecting one or more network search IDs and one or more cloud datacenters 107, 108, the user may submit a single request to execute the network search, such as by engaging a "SUBMIT" icon on the user interface 205 page.

In response to the single user request, control server 102 may generate a plurality of cloud network data requests 302, such as HTTP API calls, to each cloud datacenter 107, 108 to execute the network address searches. For example, the plurality of cloud network data requests 302 may include a request for network addresses for all regions of each cloud datacenter 107, 108. Control server 102 may generate the plurality of cloud network data requests 302 one after the other. Thus, for example, control server 102 allows network address searches to be performed near simultaneously across multiple cloud datacenters 107, 108.

In response to the plurality of cloud network data requests 302, cloud datacenter 107 provides one or more cloud network data responses 306, while cloud datacenter 108 provides one or more cloud data network responses 304. Each cloud network data response 304, 306 may include data identifying network addresses (e.g., IP addresses, subnet data, CIDR data, VLAN data) for one or more networks supported by the respective cloud datacenter 107, 107.

In some examples, control server 102 may store the obtained cloud network data, such as first cloud network data 308 provided by cloud network data response 306 and second cloud network data 310 provided by cloud network data response 304, to database 116. Control server 102 may provide first cloud network data 308 and second cloud network data 310 for display, such as by providing the data to display 206.

Each of first cloud network data 307 and second cloud network data 310 may include network data for a plurality of networks supported by each corresponding cloud datacenter. For example, first cloud network data 308 may identify cloud network data for cloud datacenter 107, and second cloud network data 310 may identify cloud network data for cloud datacenter 108. First cloud network data 308 may include first network data 312 corresponding to a first network supported by cloud datacenter 107, second network data 314 corresponding to a second network supported by cloud datacenter 107, up to $N^{th}$ network data 316 corresponding to an $N^{th}$ network supported by cloud datacenter 107. Similarly, second cloud network data 310 may include first network data 318 corresponding to a first network supported by cloud datacenter 108, second network data 320 corresponding to a second network supported by cloud datacenter 108, up to $N^{th}$ network data 322 corresponding to an $N^{th}$ network supported by cloud datacenter 108.

In some examples, a user may enter/select a cloud datacenter to execute a network address inquiry (e.g., search) by inputting, via I/O device 203, for example, a single request (e.g., via selecting a "SUBMIT" icon of the user interface 205. In response, control server 102 may transmit cloud network data requests 302 to cloud datacenters 107, 108 to obtain network data for networks supported by the cloud datacenters 107, 108. For example control server 102 may receive, via cloud network data response 304 from cloud datacenter 108 and cloud network data response 306 from cloud datacenter 107, network data for networks supported by the cloud datacenters 107, 108.

Figure 4:
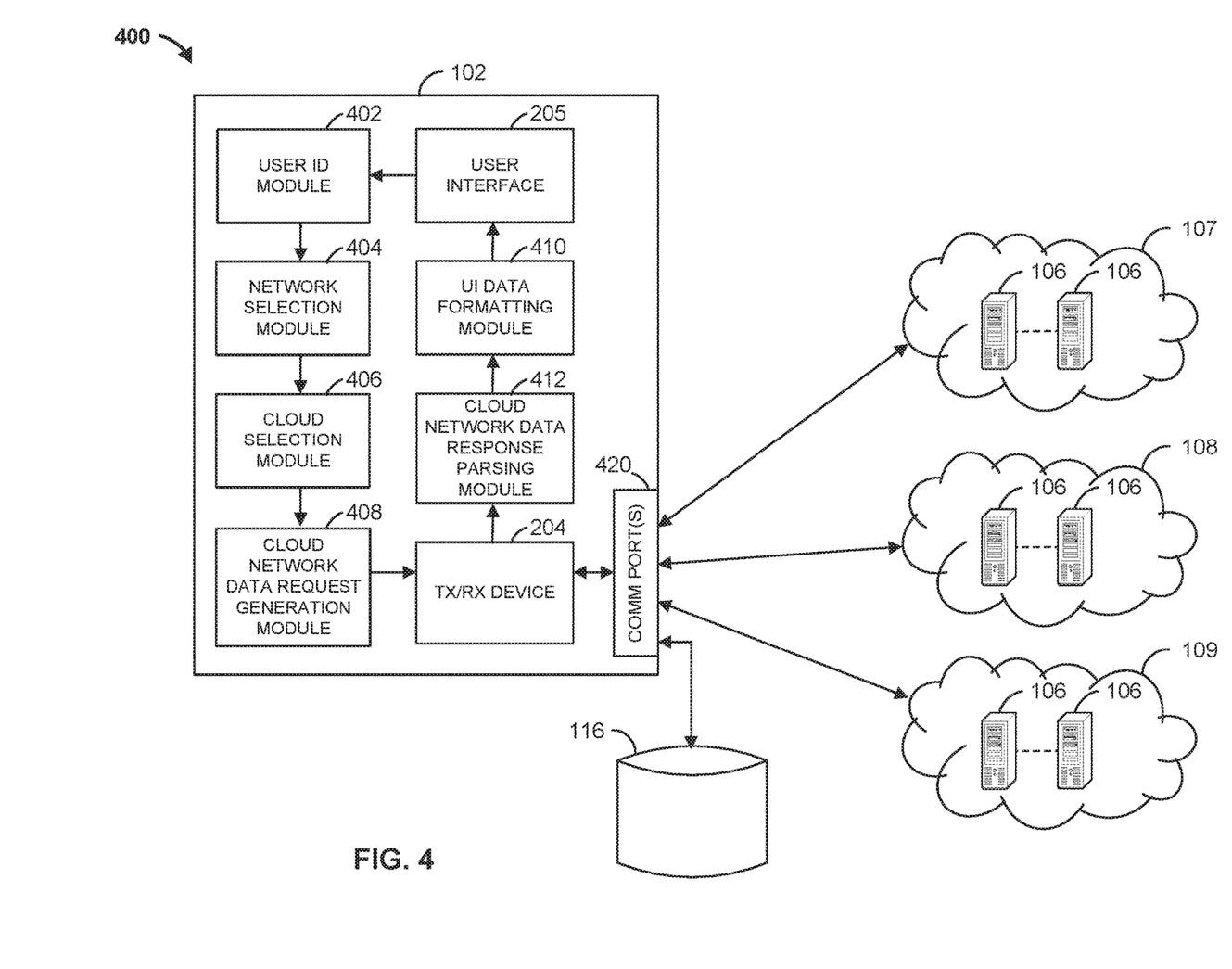
FIG. 4 is another block diagram illustrating the example control server of the server management system of FIG. 1 in accordance with some embodiments.

FIG. 4 is a block diagram illustrating an example of the control server 102 of FIG. 1. As indicated in the figure, control server 102 includes user ID module 402, network selection module 404, cloud selection module 406, cloud network data request generation module 408, user interface (UI) formatting module 410, and cloud network data response parsing module 412. In some examples, one or more of user ID module 402, network selection module 404, cloud selection module 406, cloud network data request generation module 408, user interface (UI) formatting module 410, and cloud network data response parsing module 412 may be implemented in hardware. In some examples, one or more of user ID module 402, network selection module 404, cloud selection module 406, cloud network data request generation module 408, user interface (UI) formatting module 410, and cloud network data response parsing module 412 may be implemented as an executable program maintained in a tangible, non-transitory memory, such as instruction memory 207 of FIG. 2, that may be executed by one or processors, such as processor 201 of FIG. 2.

Figure 5A:
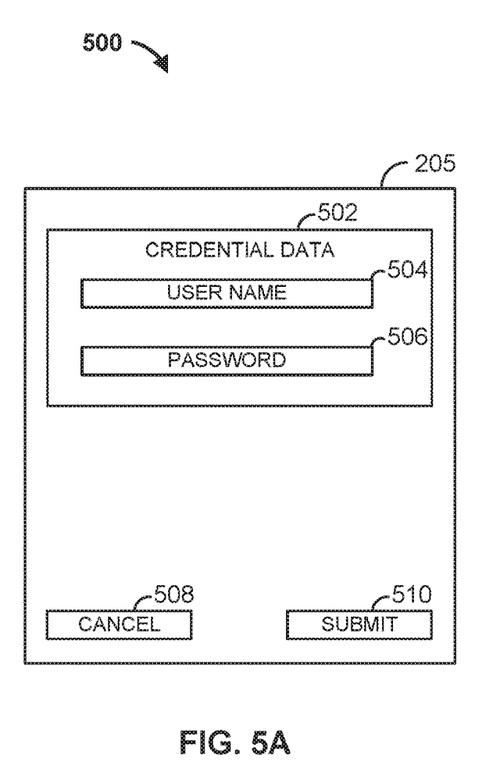
FIGS. 5A, 5B, and 5C illustrate examples of user interface pages that may be employed by the example control server of FIG. 4 in accordance with some embodiments.

In some examples, user interface 205 may present an account verification page where a user may be required to provide credential information (e.g., authentication credentials) such as a user name and a password. For example, FIG. 5A illustrates user interface 205 displaying credential data 502, which includes fillable text boxes for a username 504 and password 506. The user interface 205 also displays a "Cancel" icon 508 and "Submit" icon 510. By selecting the "Cancel" icon 508 (e.g., via I/O device 203), the text in fillable text boxes for the username 504 and password 506 are cleared.

By selecting the "Submit" icon 510, user interface 205 may provide the credential information to user ID module 402, which authenticates the credential information. If the authentication is successful, the user is permitted to log into control server 102. Assuming the authentication is successful, network selection module 404 may cause user interface 205 to display a network selection page where a user may select one or more networks that are to be queried. For example, the network selection page may allow the user to select multiple networks to be queried (e.g., searched) on cloud datacenter 107, cloud datacenter 108, and cloud datacenter 109.

Figure 5B:
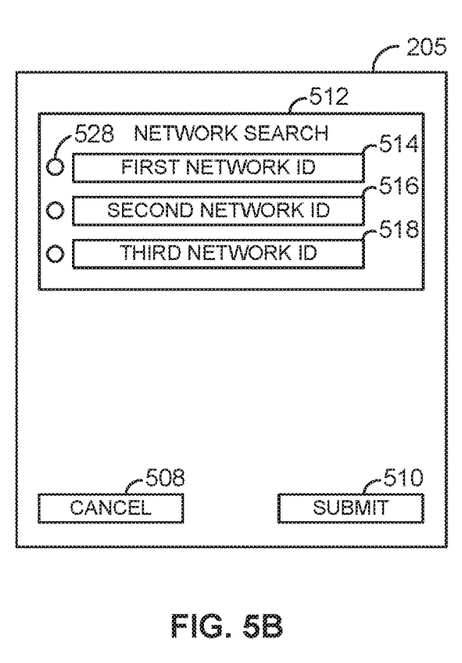

FIG. 5B illustrates a network selection page displayed via user interface 205. The network selection page illustrates various networks 512 that may be queried including network addresses identified by a first network ID 514, a second network ID 416, and a third network ID 518. Each network ID may be a network address, such as an IP address, a CIDR address, a range of network addresses, or any other network address. A user may select and deselect the networks 512 by selecting one or more of the radio selection icons 528.

Figure 5C:
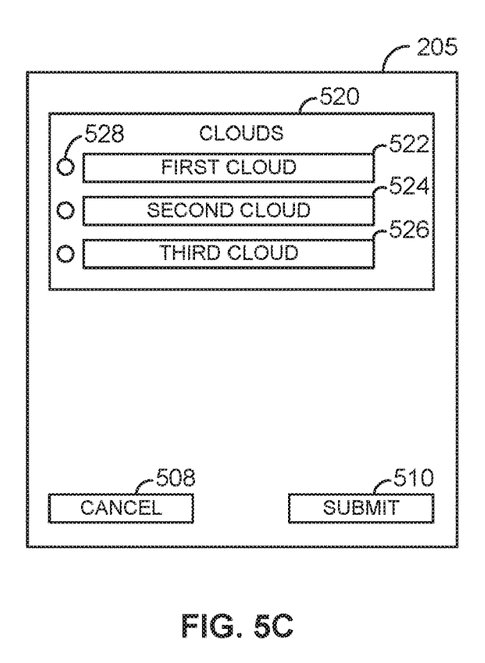

After selecting any network addresses to be queried, the user may select the "Submit" icon 510, which may cause network selection module 404 to store the selected network addresses in memory, such as in working memory 202 or database 116. Cloud selection module 406 may then cause user interface 205 to display a cloud selection page where the user may select one or more cloud datacenters to search for the selected network addresses. For example, FIG. 5C illustrates a cloud selection page displayed via user interface 205. The cloud selection page includes the ability to select clouds 520 including first cloud 522, second cloud 524, and third cloud 526 via radio selection icons 528. For example, first cloud 522 may correspond to cloud datacenter 107. Second cloud 524 may correspond to cloud datacenter 108, and third cloud 526 may correspond to cloud datacenter 109.

After selecting the cloud datacenters, the user may select the "Submit" icon 510, which may cause cloud selection module 406 to store the selected clouds in memory, such as in working memory 202 or database 116. Cloud network data request generation module 408 may then generate one or more cloud network data requests 302 to query the one or more cloud datacenters 107, 108, 109 for any supported networks. For example, cloud network data request generation module 408 may obtain the cloud selection information from memory, such as working memory 202 or database 116, and generate a plurality of cloud network data requests 302 to execute a network query on a plurality of cloud datacenters 107, 108, 109, namely, the selected cloud datacenters.

For example, cloud network data request generation module 408 may generate a cloud network data request 302 to query for supported networks on any first cloud 522, if selected. Similarly, cloud network data request generation module 408 may generate a cloud network data request 302 to query for supported networks on second cloud 524, if selected. Cloud network data request generation module 408 may also generate a cloud network data request 302 to query for supported networks on third cloud 526, if selected.

Cloud network data request generation module 408 may provide the generated cloud network data requests 302 to transceiver 204 for transmission to the respective cloud datacenters 107, 108, 109. For example, cloud network data request generation module 408 may provide the cloud network data requests 302 to transceiver 204 as they are generated, and transceiver 204 may provide them to communication ports 420 to be transmitted over a network, such as network 118. The generated cloud network data requests 302 may be HTTP API calls to respective cloud regions of each selected cloud.

In response to receiving the cloud network data requests 302, cloud datacenters 107, 108, 109 may respond with cloud network data responses, such as cloud network data response 304 and cloud network data response 306. Each cloud network data response may include, for example, network data identifying any networks supported by each respective cloud datacenter 107, 108, 109.

The cloud data responses are received via communication ports 420 and provided to transceiver 205. Transceiver 205 receives the cloud data responses and provides them to cloud network data response parsing module 412. Cloud network data response parsing module 412 may parse each cloud network data response to extract the network data, and may save the network data to, for example, database 116.

In some examples, cloud network data response parsing module 412 determines whether the obtained network data corresponds to any of the selected network addresses. For example, cloud network data response parsing module 412 may compare network data parsed from a cloud network data response to first network ID 514, if selected. For example, cloud network data response parsing module 412 may determine if a selected network address falls within a network defined by the network data response (e.g., within the same subnet, or CIDR class). Similarly, cloud network data response parsing module 412 may also compare the network data parsed from each cloud network data response to second network ID 516, if selected, as well as third network ID 518, also if selected. If there is a match, cloud network data response parsing module 412 may store an indication of the match in memory, such as in working memory 202 or database 116.

Cloud network data response parsing module 412 may also provide the network data to user interface (UI) data formatting module 410, which may format the data as required for display via user interface 205 on display 206. Display 206 may then display the network data via user interface 205. Cloud network data response parsing module 412 may also provide to the network data to UI data formatting module 410 data identifying whether there was a match between any selected network address and obtained network data. UI data formatting module 410 may format the data to display via user interface 205 on display 206. For example, display 206 may indicate whether there was a match for any selected network 512, and if so, may also identify the corresponding network data that matched.

Figure 6:
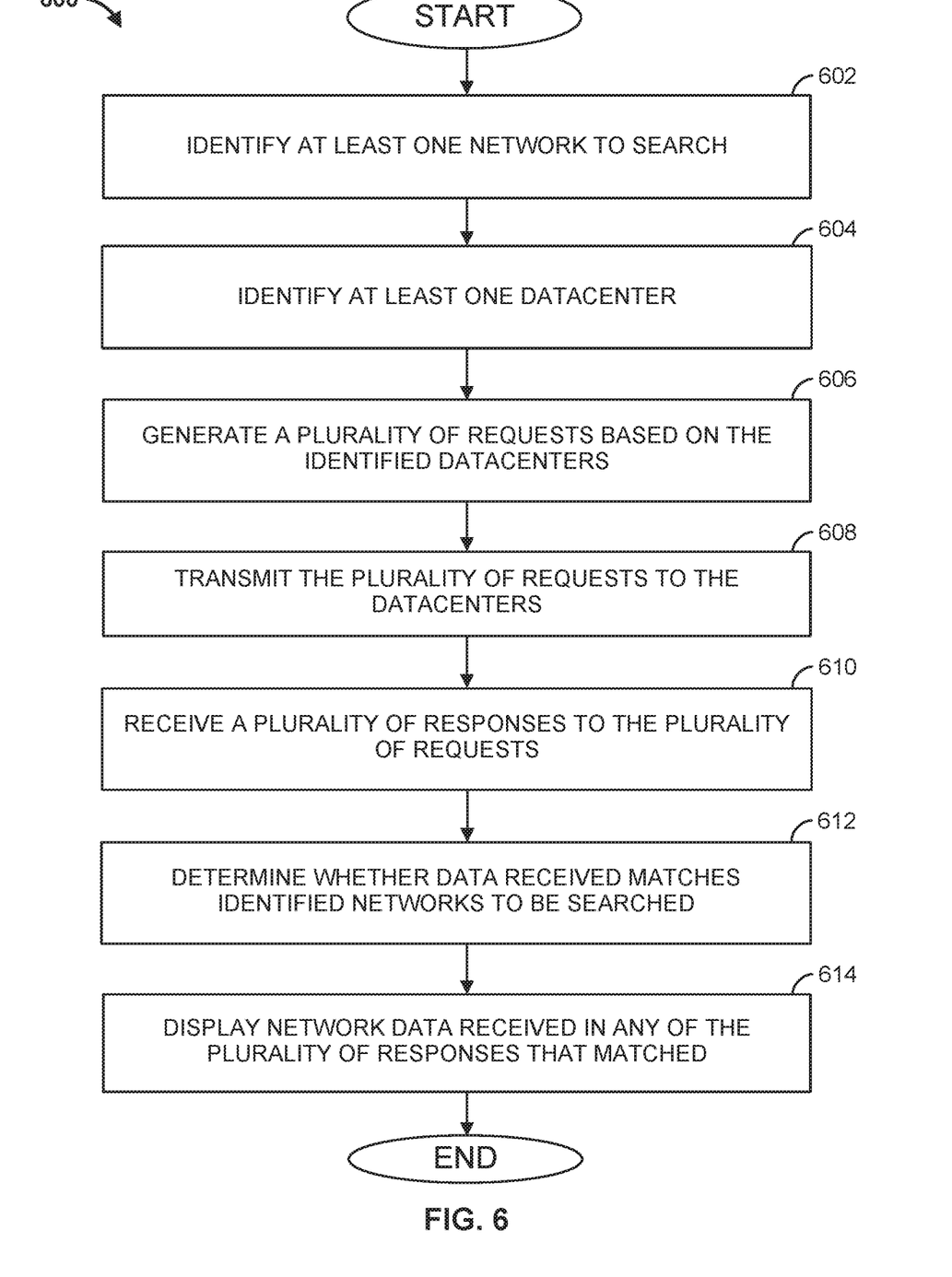
FIG. 6 is a flowchart of an example method that can be carried out by the example control server of FIG. 1 in accordance with some embodiments.

FIG. 6 is a flowchart of an example method 600 that can be carried out by a computing device, such as the control server 102 of FIG. 1. Beginning at step 602, at least one network address to be searched for is identified. For example, the network address may one identified by first network ID 514, second network ID 516, or third network ID 518. At step 604, at least one datacenter is identified. For example, the datacenter may be one identified by first cloud 522, second cloud 524, or third cloud 526. Proceeding to step 606, a plurality of requests are generated based on the identified datacenters. For example, the plurality of requests may be cloud network data requests 302. Each of the plurality of requests may include, for example, a query to one or more datacenters, or one or more regions of multiple datacenters, for all networks supported by that datacenter or region of datacenter.

At step 608, the plurality of requests are transmitted. For example, the plurality of requests may be transmitted via transceiver 205 one after the other. In response to the transmissions, at step 610 a plurality of responses containing network data are received. For example, a cloud network data response 304, 306 may be received from each datacenter a request was transmitted to.

Proceeding to step 612, a determination is made as to whether the network data received from each response matches an identified network address to search, as identified in step 602. For example, network data received may be compared to each identified network address to search, and status data may be identifying any matches identified. At step 614, network data received in any of the plurality of responses that matches any of the identified networks to search is provided for display. For example, the matching network data may be displayed via a user interface 205 displayed on display 206.

Figure 7:
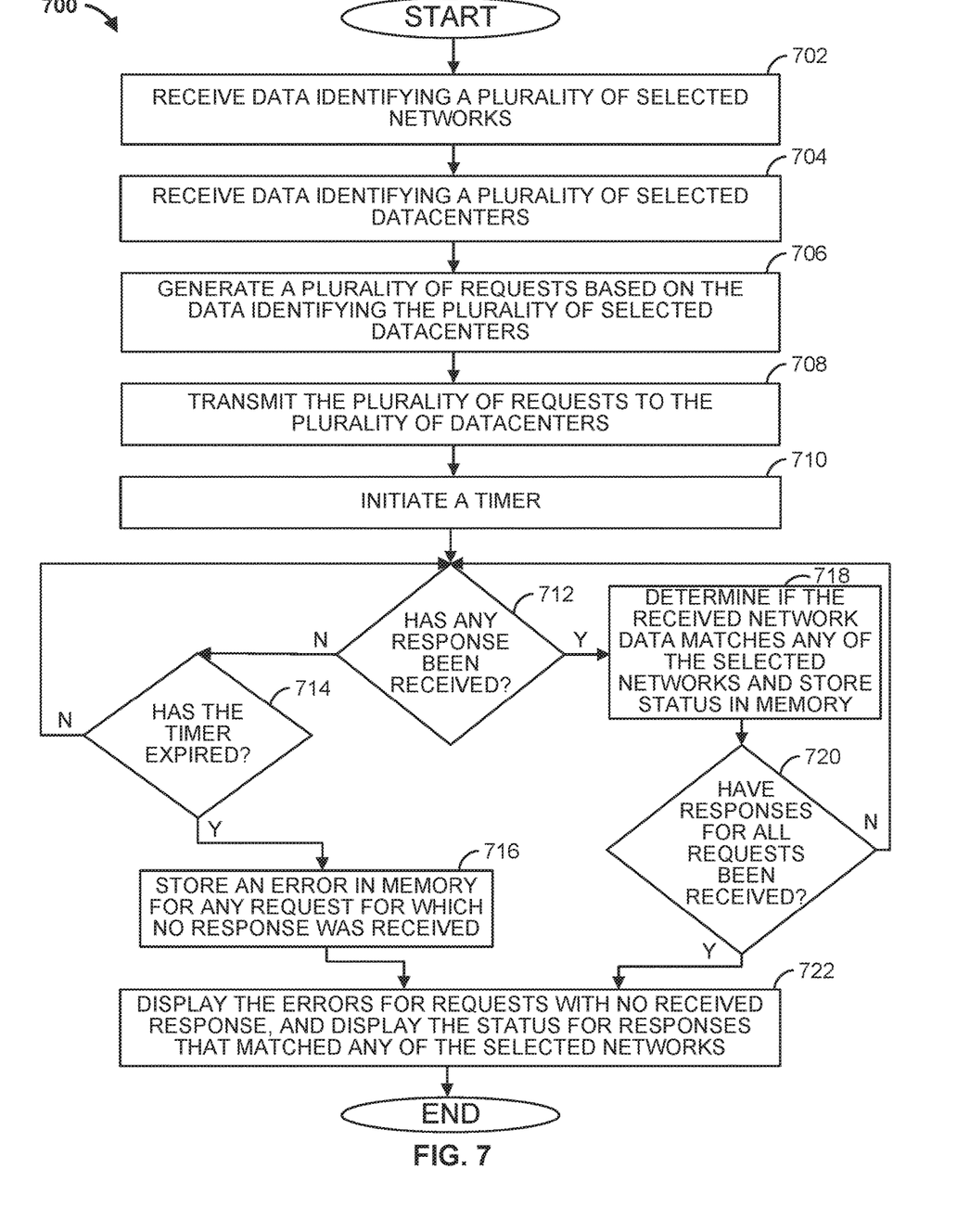
FIG. 7 is a flowchart of another example method that can be carried out by the example control server of FIG. 1 in accordance with some embodiments.

FIG. 7 is a flowchart of an example method 700 that can be carried out by a computing device, such as the control server 102 of FIG. 1. Beginning at step 702, data identifying a plurality of selected network addresses is received. For example, the data may identify first network ID 514, second network ID 516, and third network ID 518. Proceeding to step 704, data identifying a plurality of selected datacenters is received. For example, the data may identify first cloud 522, second cloud 524, and third cloud 526, which may correspond to cloud datacenter 107, cloud datacenter 108, and cloud datacenter 109, respectively. At step 706, based on the data identifying the plurality of selected datacenters, a plurality of requests are generated. For example, a cloud network data request is generated for each identified datacenter. In some examples, a request to a datacenter may include a request for network data for multiple datacenter regions. At step 708, the plurality of requests are transmitted to the identified datacenters.

Proceeding to step 710, a timer is initiated (e.g., started). The timer may be set to a threshold value, such as a number of seconds or minutes, and begins to count down. The method then proceeds to step 712, where the method determines if any response, such as cloud network data response 304 or cloud network data response 306, to a request has been received.

If, at step 712, a response has been received, the method proceeds to step 718, where a determination is made as to whether network data received in the response matches any of the plurality of selected network addresses. Based on the determination, status identifying if there was a match is stored in memory, such as in database 116. For example, for a response that includes network data matching to a selected network address, the status may identify and characterize the match. The method then proceeds to step 720, where a determination is made as to whether responses for all of the requests have been received. If all the responses have not been received, the method proceeds back to step 712, where the method determines if another response has been received. Otherwise, if all the responses have been received, the method proceeds to step 722.

Back at step 712, if no response has been received, the method proceeds to step 714, where a determination is made as to whether the timer has expired. If the timer has not expired, the method proceeds back to step 712, where the method continues to determine if a response has been received. If the timer has expired, the method proceeds to step 716, where, for every request that was transmitted where no response was received, an error indication is stored in memory for that request. For example, if a request was transmitted to first cloud 522, but no response was received, an error indicating that the request failed is stored in memory, such as in database 116. The method then proceeds to step 722.

At step 722, which may be proceeded to from step 716 or step 720, status is displayed. For requests with no received response, the error is displayed. For responses that matched any of the plurality of selected network addresses, status identifying and characterizing the match is displayed. In some examples, for each request to each datacenter, a status is displayed indicating whether the request to that datacenter was successful, and whether there was a match to a selected network address. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a computing device comprising at least one processor, wherein the computing device is configured to:
   receive first data identifying at least one network address to be searched;
   receive second data identifying a plurality of datacenters for which to search for the at least one network address;
   receive a user request to search the plurality of datacenters for the at least one network address;
   generate, in response to the user request, a plurality of requests to the plurality of datacenters, wherein each of the plurality of requests is a request to a corresponding datacenter of the plurality of datacenters for at least one network supported by the corresponding datacenter; and
   transmit the plurality of requests to the plurality of datacenters.

2. The system of claim 1, wherein the computing device is configured to:
   receive at least one response to the transmitted plurality of requests to the plurality of datacenters, wherein the at least one response comprises network data identifying at least one supported network; and
   determine that the at least one supported network corresponds to the at least one network address.

3. The system of claim 2, wherein the at least one supported network is a CIDR based network.

4. The system of claim 2, wherein the computing device is configured to determine that the at least one supported network corresponds to the at least one network address by comparing the at least one supported network to the at least one network address.

5. The system of claim 2, wherein the computing device is configured to provide an indication for display that the at least one supported network corresponds to the at least one network address.

6. The system of claim 1, wherein the computing device is configured to:
receive the first data identifying the at least one network address based on a first user input; and
receive the second data identifying the plurality of datacenters based on a second user input.

7. The system of claim 1, wherein the computing device is configured to:
generate a first request of the plurality of requests for a first datacenter of the plurality of datacenters; and
generate a second request of the plurality of requests for a second datacenter of the plurality of datacenters.

8. The system of claim 1, wherein the computing device is configured to:
determine a datacenter region for the plurality of servers; and
transmit the plurality of requests to the datacenter region.

9. The system of claim 1, wherein the computing device is configured to:
determine whether a response to each request of the plurality of requests has been received; and
provide an indication for display of the determination of whether the response to each of the plurality of requests has been received.

10. The system of claim 9 wherein the computing device is configured to determine that the response to each request of the plurality of requests has not been received after a period of time has expired.

11. A method comprising:
receiving first data identifying at least one network address to be searched;
receiving second data identifying a plurality of datacenters for which to search for the at least one network address;
receiving a user request to search the plurality of datacenters for the at least one network address;
generating, in response to the user request, a plurality of requests to the plurality of datacenters, wherein each of the plurality of requests is a request to a corresponding datacenter of the plurality of datacenters for at least one network supported by the corresponding datacenter; and
transmitting the plurality of requests to the plurality of datacenters.

12. The method of claim 11 further comprising:
receiving at least one response to the transmitted plurality of requests to the plurality of datacenters, wherein the at least one response comprises network data identifying at least one supported network; and
determining that the at least one supported network corresponds to the at least one network address.

13. The method of claim 12 further comprising:
determining that the at least one supported network corresponds to the at least one network address by comparing the at least one supported network to the at least one network address.

14. The method of claim 11 further comprising:
generating a first request of the plurality of requests for a first datacenter of the plurality of datacenters; and
generating a second request of the plurality of requests for a second datacenter of the plurality of datacenters.

15. The method of claim 11 further comprising:
determining a datacenter region for the plurality of servers; and
transmitting the plurality of requests to the identified datacenter region.

16. The method of claim 11 further comprising:
determining whether a response to each request of the plurality of requests has been received; and
providing an indication for display of the determination of whether the response to each of the plurality of requests has been received.

17. A non-transitory computer readable medium having instructions stored thereon, wherein the instructions, when executed by at least one processor, cause a device to perform operations comprising:
receiving first data identifying at least one network address to be searched;
receiving second data identifying a plurality of datacenters for which to search the at least one network address;
receiving a user request to search the plurality of datacenters for the at least one network address;
generating, in response to the user request, a plurality of requests to the plurality of datacenters, wherein each of the plurality of requests is a request to a corresponding datacenter of the plurality of datacenters for at least one network supported by the corresponding datacenter; and
transmitting the plurality of requests to the plurality of datacenters.

18. The non-transitory computer readable medium of claim 17 further comprising instructions stored thereon that, when executed by at least one processor, further cause the device to perform operations comprising:
receiving at least one response to the transmitted plurality of requests to the plurality of datacenters, wherein the at least one response comprises network data identifying at least one supported network; and
determining that the at least one supported network corresponds to the at least one network address.

19. The non-transitory computer readable medium of claim 18 further comprising instructions stored thereon that, when executed by at least one processor, further cause the device to perform operations comprising:
determining that the at least one supported network corresponds to the at least one network address by comparing the at least one supported network to the at least one network address.

20. The non-transitory computer readable medium of claim 17 further comprising instructions stored thereon that, when executed by at least one processor, further cause the device to perform operations comprising:
determining whether a response to each request of the plurality of requests has been received; and
providing an indication for display of the determination of whether the response to each of the plurality of requests has been received.

* * * * *